(12) United States Patent
Ryuno et al.

(10) Patent No.: US 11,590,835 B2
(45) Date of Patent: Feb. 28, 2023

(54) ELECTRIC POWERED VEHICLE

(71) Applicants: TOYOTA JIDOSHA KABUSHIKI KAISHA, Aichi (JP); SUBARU CORPORATION, Tokyo (JP)

(72) Inventors: Yoshiyuki Ryuno, Nagoya (JP); Yusuke Muroi, Tokyo-to (JP)

(73) Assignees: TOYOTA JIDOSHA KABUSHIKI KAISHA, Aichi-Ken (JP); SUBARU CORPORATION, Tokyo (JP)

( * ) Notice: Subject to any disclaimer, the term of this patent is extended or adjusted under 35 U.S.C. 154(b) by 25 days.

(21) Appl. No.: 17/128,207

(22) Filed: Dec. 21, 2020

(65) Prior Publication Data

US 2021/0221210 A1  Jul. 22, 2021

(30) Foreign Application Priority Data

Jan. 17, 2020  (JP) .............................. JP2020-005973

(51) Int. Cl.
*B60K 1/00* (2006.01)
*B60L 50/60* (2019.01)
*B62D 21/11* (2006.01)

(52) U.S. Cl.
CPC ................ *B60K 1/00* (2013.01); *B60L 50/66* (2019.02); *B62D 21/11* (2013.01)

(58) Field of Classification Search
CPC .............. B60K 1/00; B60K 2001/0411; B60K 2001/001; B60L 50/66; B62D 21/11
See application file for complete search history.

(56) References Cited

U.S. PATENT DOCUMENTS

| | | | |
|---|---|---|---|
| 8,567,851 B2 * | 10/2013 | Morden | B62D 25/081 296/192 |
| 2015/0021953 A1 * | 1/2015 | Chung | B62D 25/088 296/187.09 |
| 2015/0027799 A1 | 1/2015 | Omi et al. | |
| 2015/0028629 A1 * | 1/2015 | Sasaki | B62D 25/082 296/192 |
| 2016/0159211 A1 | 6/2016 | Nakagawa | |
| 2017/0158246 A1 * | 6/2017 | Kang | B62D 25/081 |
| 2017/0166258 A1 * | 6/2017 | Kim | B62D 25/082 |
| 2018/0201108 A1 * | 7/2018 | Okuda | B60L 50/66 |
| 2020/0023907 A1 | 1/2020 | Yoshida et al. | |
| 2020/0269785 A1 * | 8/2020 | Salter | B60K 11/06 |
| 2021/0053623 A1 * | 2/2021 | Shimokouchi | B60R 16/0215 |
| 2022/0281289 A1 * | 9/2022 | Mogi | B62D 25/081 |

FOREIGN PATENT DOCUMENTS

| | | | | |
|---|---|---|---|---|
| CN | 103101452 A | * | 5/2013 | |
| CN | 103101452 A | | 5/2013 | |
| CN | 206317891 U | * | 7/2017 | ........... B62D 25/082 |

(Continued)

*Primary Examiner* — James A Shriver, II
*Assistant Examiner* — Michael T. Walsh
(74) *Attorney, Agent, or Firm* — Hauptman Ham, LLP

(57) ABSTRACT

An electric powered vehicle includes a motor for driving one or more wheels. The electric powered vehicle may include a body including a dash panel, a cowl disposed along an upper end of the dash panel and at least partly located forward of the dash panel, an electric unit located forward of the dash panel and supported by the body, and a connector connecting the electric unit and an intermediate portion of the cowl to each other.

13 Claims, 2 Drawing Sheets

(56) References Cited

FOREIGN PATENT DOCUMENTS

| | | | | |
|---|---|---|---|---|
| JP | 2003112519 | A | | 4/2003 |
| JP | 2010221879 | A | | 10/2010 |
| JP | 2012144227 | A * | | 8/2012 |
| JP | 201649898 | A | | 4/2016 |
| JP | 2016049898 | A * | | 4/2016 |
| JP | 2016107913 | A | | 6/2016 |
| JP | 2018114896 | A | | 7/2018 |
| JP | 201927401 | A | | 2/2019 |
| KR | 19980045488 | A * | | 12/1996 |
| KR | 19980045488 | A * | | 9/1998 |
| WO | 2013108774 | A1 | | 7/2013 |
| WO | 2018180382 | A1 | | 10/2018 |

* cited by examiner ions of the electric powered vehicle 10.

ELECTRIC POWERED VEHICLE

CROSS-REFERENCE TO RELATED APPLICATION

This application claims priority to Japanese Patent Application No. 2020-005973, filed on Jan. 17, 2020, the entire contents of which are incorporated herein by reference.

TECHNICAL FIELD

The teachings disclosed herein relate to an electric powered vehicle, particularly to a front structure of an electric powered vehicle. The electric powered vehicle herein broadly means a vehicle including a motor for driving one or more wheels, and its examples include a rechargeable electric vehicle configured to be charged by an external power source, a fuel-cell vehicle powered by a fuel cell, a hybrid vehicle including a motor and an engine, and the like.

BACKGROUND

Japanese Patent Application Publication No. 2019-27401 describes an engine vehicle. The engine vehicle includes a body including a dash panel and a cowl disposed along an upper end of the dash panel. The cowl at least partly protrudes and is located forward of the dash panel, such that entry of foreign matter into a front compartment (also termed an engine compartment) is prevented.

SUMMARY

In the above-described engine vehicle, rigidity of the cowl is increased by a reinforcement being joined to the cowl, in order to avoid deformation of the cowl. However, sufficiently increasing the rigidity of the cowl requires a relatively large reinforcement, which may lead to an increase in vehicle weight. In view of this, the disclosure herein provides teachings that suppress deformation of a cowl while suppressing an increase in vehicle weight.

The teachings disclosed herein provide an electric powered vehicle including a motor for driving one or more wheels. The electric powered vehicle may comprise a body comprising a dash panel, a cowl disposed along an upper end of the dash panel and at least partly located forward of the dash panel, an electric unit located forward of the dash panel and supported by the body, and a connector connecting the electric unit and an intermediate portion of the cowl to each other.

In the above-described electric powered vehicle, the intermediate portion of the cowl is connected to the electric unit via the connector. Such a configuration can effectively suppress deformation of the cowl even though the connector is relatively simple (i.e., lightweight). The electric unit does not vibrate as an engine does, and hence connecting the cowl to the electric unit does not generate unpleasant noise or vibration. The teachings disclosed herein can therefore be adopted more suitably in an electric powered vehicle than in an engine vehicle.

DETAILED DESCRIPTION

Figure 1:
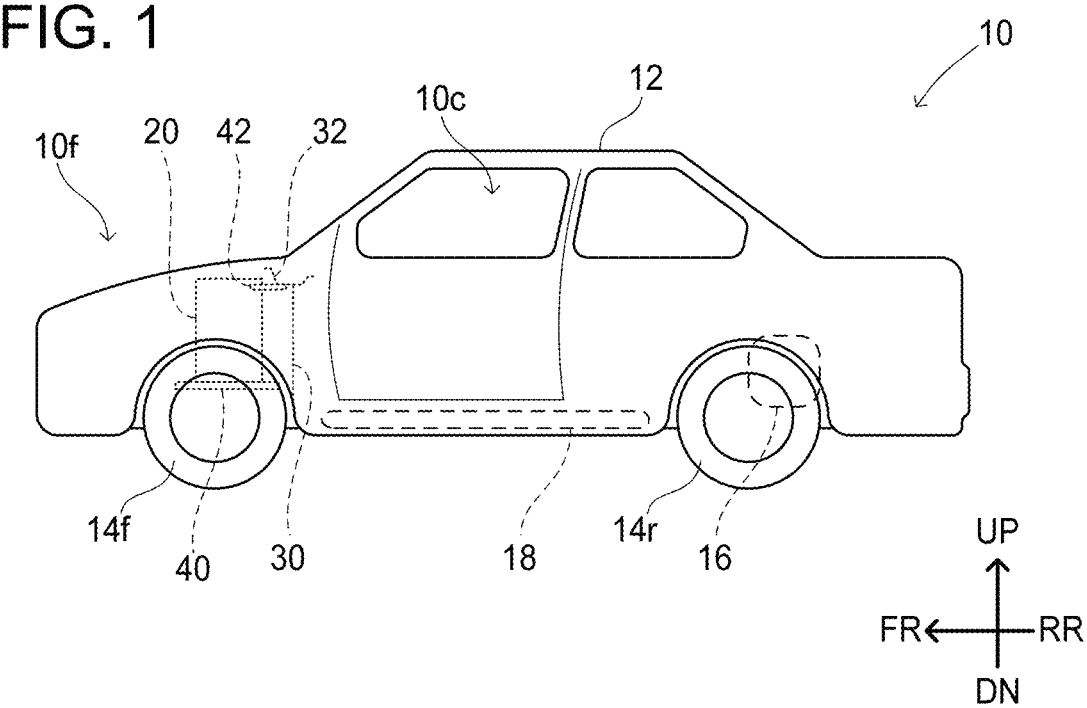
FIG. 1 is a schematic diagram for a configuration of an electric powered vehicle 10 according to an embodiment.

In an embodiment of the present teachings, the electric unit may include a housing and a high-voltage component housed within the housing, and the connector may connect the housing of the electric unit and the intermediate portion of the cowl to each other. In this case, the connector may be integrated with the housing, but is not particularly limited thereto. The high-voltage component herein means an electric component configured to operate at an AC voltage exceeding 30 volts or a DC voltage exceeding 60 volts.

In the above-described embodiment, the high-voltage component may include a power converter configured to control electric power to be supplied to the motor. In this case, the power converter may include, for example, at least one of a DC-DC converter and an inverter.

In the above-described embodiment, the housing of the electric unit may be constituted of an electrically insulation material.

In an embodiment of the present teachings, the body may further include amount frame supporting the electric unit from below. Such a configuration can suppress deformation of the cowl more effectively because the electric unit is stable to the body.

In an embodiment of the present teachings, the cowl may include a reinforcement at the intermediate portion to which the connector is connected. Such a configuration can suppress deformation of the cowl more effectively.

In an embodiment of the present teachings, the body may further include a pair of right and left suspension towers. In this case, each end of the cowl may be connected to a corresponding one of the suspension towers. The suspension towers usually have three-dimensional shapes and have relatively high rigidity. Therefore, connecting the ends of the cowl to the suspension towers can effectively increase rigidity of the cowl. In another embodiment, each end of the cowl may be connected to a corresponding one of apron upper members, in place of or in addition to corresponding one of the suspension towers.

In the disclosure herein, a simple phrase "front-rear directions" means front-rear directions of the electric powered vehicle. Similarly, a simple phrase "right-left directions" means right-left directions of the electric powered vehicle, and a simple phrase "up-down directions" means up-down directions of the electric powered vehicle. For example, when the electric powered vehicle is placed on a horizontal plane, the up-down directions of the electric powered vehicle coincide with a vertical direction. Moreover, the right-left directions of the electric powered vehicle are directions parallel to an axle of the electric powered vehicle, and the front-rear directions of the electric powered vehicle are directions parallel to the horizontal plane and perpendicular to the axle of the electric powered vehicle.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved electric powered vehicles, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

With reference to the drawings, an electric powered vehicle 10 according to an embodiment will be described. As shown in FIG. 1, the electric powered vehicle 10 includes a body 12 and a plurality of wheels 14f, 14r. The body 12 is constituted of metal, but is not particularly limited thereto. A passenger compartment and a luggage compartment are defined within the body 12. The plurality of wheels 14f, 14r includes a pair of front wheels 14f and a pair of rear wheels 14r. The number of the wheels 14f, 14r is not limited to four.

The electric powered vehicle 10 further includes a motor 16, a battery unit 18, and an electric unit 20. The motor 16 is configured to drive at least one of the plurality of wheels 14f, 14r (e.g., the pair of rear wheels 14r). The battery unit 18 is connected to the motor 16 via the electric unit 20. The battery unit 18 includes a plurality of secondary battery cells therein, and is repeatedly chargeable with external electric power.

The electric unit 20 includes a power converter 22 (see FIG. 3), such as a DC-DC converter and/or an inverter, and is configured to control electric power to be supplied from the battery unit 18 to the motor 16. The motor 16, the battery unit 18, and the power converter 22 are so-called high-voltage components, and are electric components configured to operate at an AC voltage exceeding 30 volts or a DC voltage exceeding 60 volts.

Figure 2:
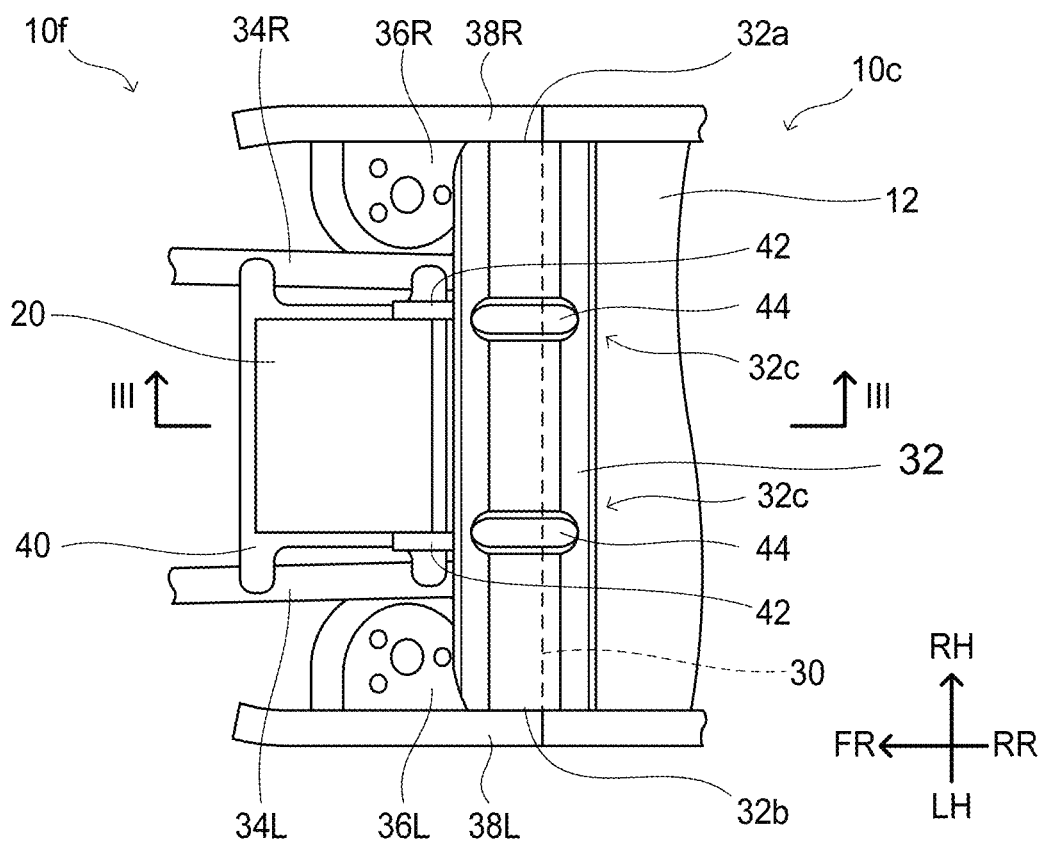
FIG. 2 is a schematic diagram for a front structure 10f of the electric powered vehicle 10.
Figure 3:
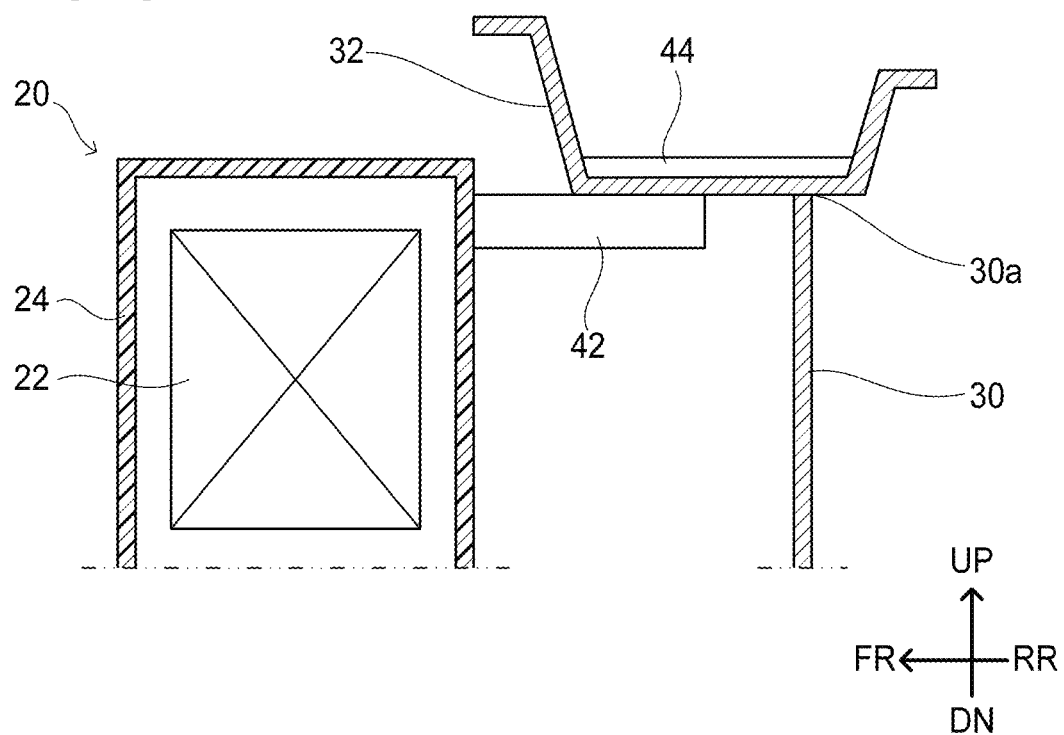
FIG. 3 is a cross-sectional view along a line III-III in FIG. 2. In the drawings above, a direction FR indicates a front direction of front-rear directions of the electric powered vehicle 10, and a direction RR indicates a rear direction of the front-rear directions of the electric powered vehicle 10. A direction RH indicates a right direction of right-left directions of the electric powered vehicle 10, and a direction LH indicates a left direction of the right-left directions of the electric powered vehicle 10. A direction UP indicates an up direction of up-down directions of the electric powered vehicle 10, and a direction DN indicates a down direction of the up-down directions of the electric powered vehicle 10.

With reference to FIGS. 1 to 3, a front structure 10 of the electric powered vehicle 10 will be described. The body 12 includes a dash panel 30 and a cowl 32. The dash panel 30 defines a boundary between the front structure 10f of the electric powered vehicle 10 and a cabin 10c located rearward of the front structure 10f. The cowl 32 is disposed along an upper end 30a of the dash panel 30 and is at least partly located frontward of the dash panel 30. The cowl 32 of the present embodiment is a plate having a groove-shaped cross section, and extends along the right-left directions.

The body 12 further includes a pair of a right front side member 34R and a left front side member 34L, a pair of a right suspension tower 36R and a left suspension tower 36L, and a pair of a right apron upper member 38R and a left apron upper member 38L. The front side members 34R, 34L each extend forward from the dash panel 30. The suspension towers 36R, 36L are respectively located outside the front side members 34R, 34l, and respectively define spaces for housing suspension components outside the front side members 34R, 34L. The apron upper members 38R, 38L are respectively located outside the suspension towers 36R, 36L, and each extend forward from the dash panel 30.

The body 12 further includes a mount frame 40. The mount frame 40 is fixed to the pair of front side members 34R, 34L, and supports the electric unit 20 from below. The electric unit 20 is thereby fixed firmly to the body 12. The electric unit 20 includes a housing 24 housing the power converter 22 mentioned above. The housing 24 is constituted of an electrically insulation material, and electrically insulates the power converter 22 from the body 12.

The electric powered vehicle 10 of the present embodiment further includes two connectors 42. The connectors 42 each connect the electric unit 20 and an intermediate portion 32c of the cowl 32 to each other. The intermediate portion 32c of the cowl 32 is supported by the electric unit 20, and deformation of the cowl 32 is thereby effectively suppressed. The electric unit 20 does not vibrate as an engine does, and hence connecting the cowl 32 to the electric unit 20 do not generate unpleasant noise or vibration. Specific configurations of the connectors 42 are not particularly limited. The connectors 42 can be designed to have relatively simple (i.e., lightweight) structures.

In the electric powered vehicle 10 of the present embodiment, ends 32a, 32b of the cowl 32 are respectively connected to the suspension towers 36R, 36L, but are not particularly limited thereto. Each of the suspension towers 36R, 36L has a three-dimensional shape and has relatively high rigidity. Therefore, connecting the ends 32a, 32b of the cowl 32 to the suspension towers 36R, 36L can effectively increase rigidity of the cowl 32. In another embodiment, the ends 32a, 32b of the cowl 32 may respectively be connected to the apron upper members 38R, 38I, in place of or in addition to the suspension towers 36R, 36L.

In the electric powered vehicle 10 of the present embodiment, a reinforcement 44 is provided at the intermediate portion 32c of the cowl 32 to which the connectors 42 are connected, but is not particularly limited thereto. A relatively large force may be applied from the connectors 42 onto the intermediate portion 32c of the cowl 32. Owing to the reinforcement member 44 provided at the intermediate portion 32c of the cowl 32, deformation of the cowl 32 can be suppressed more effectively. In other words, the electric unit 20 can be stabilized by the cowl 32 and the connectors 42, as well. As an example, in the cowl 32 of the present embodiment, the connectors 42 are joined to a lower surface of the cowl 32, the reinforcement 44 is joined to an upper surface of the cowl 32, and the connectors 42 and the reinforcement 44 are opposed to each other with the cowl 32 interposed therebetween.

The electric powered vehicle 10 of the present embodiment includes the two connectors 42, but the number of the connectors 42 is not limited to two. In another embodiment, the electric powered vehicle 10 may include a single connector 42, or three or more connectors 42. Moreover, if the electric powered vehicle 10 includes a plurality of connectors 42, these connectors 42 may have an identical shape or different shapes from one another. Moreover, each connector 42 may be configured of a plurality of members.

In the electric powered vehicle 10 of the present embodiment, each of the connectors 42 is configured of an independent member. However, in another embodiment, each connector 42 may at least partly be integrated with the housing 24 of the electric unit 20 or the cowl 32. For example, a part of each connector 42 may be integrated with the housing 24 of the electric unit 20, and another part of the connector 42 may be integrated with the cowl 32.

Material of the connectors 42 is not particularly limited. The connectors 42 may be constituted of a metal material, a resin material, or a combination of a metal material and a resin material. At least partly constituting the connectors 42 of a resin material can decrease the weight of the connectors 42. Moreover, the resin material may be a fiber-reinforced resin or may contain various types of fillers.

What is claimed is:

1. An electric powered vehicle including a motor for driving one or more wheels, the electric powered vehicle comprising:
    a body comprising a dash panel;
    a cowl disposed along an upper end of the dash panel and at least partly located forward of the dash panel, the cowl extending along the upper end of the dash panel and having a cross-sectional shape that defines a groove that opens upward;
    an electric unit located forward of the dash panel and supported by the body, the electric unit being located outside the groove defined by the cowl; and
    a connector connecting the electric unit and an intermediate portion of the cowl to each other.

2. The electric powered vehicle according to claim 1, wherein
    the electric unit comprises a housing and a high-voltage component housed within the housing, and
    the connector connects the housing of the electric unit and the intermediate portion of the cowl to each other.

3. The electric powered vehicle according to claim 2, wherein the high-voltage component comprises a power converter configured to control electric power to be supplied to the motor.

4. The electric powered vehicle according to claim 2, wherein the housing is constituted of an electrically insulating material.

5. The electric powered vehicle according to claim 1, wherein the body further comprises a mount frame supporting the electric unit from below.

6. The electric powered vehicle according to claim 1, wherein the cowl comprises a reinforcement at the intermediate portion.

7. The electric powered vehicle according to claim 1, wherein
    the body further comprises a pair of suspension towers, and
    each end of the cowl is connected to a corresponding one of the pair of suspension towers.

8. The electric powered vehicle according to claim 1, wherein
    the electric unit comprises a housing and a high-voltage component housed within the housing,
    the connector connects the housing of the electric unit and the intermediate portion of the cowl to each other, and
    the cowl comprises a reinforcement at the intermediate portion.

9. The electric powered vehicle according to claim 8, wherein
    the body further comprises a pair of suspension towers, and
    each end of the cowl is connected to a corresponding one of the pair of suspension towers.

10. The electric powered vehicle according to claim 1, wherein
    the body further comprises a pair of front side members extending forward from the dash panel, and
    the pair of front side members is located below the cowl and supports the electric unit.

11. The electric powered vehicle according to claim 10, wherein
    the body further comprises a mount frame secured on the pair of front side members, and
    the pair of front side members supports the electric unit via the mount frame.

12. The electric powered vehicle according to claim 1, wherein
    the cowl comprises a bottom wall that defines a bottom of the groove,
    the connector is joined on a lower surface of the bottom wall and extends forward to the electric unit.

13. The electric powered vehicle according to claim 12, wherein
    the cowl further comprises a reinforcement joined on an upper surface of the bottom wall at the intermediate portion of the cowl.

* * * * *